United States Patent [19]

Barbero et al.

[11] Patent Number: 4,503,442

[45] Date of Patent: Mar. 5, 1985

[54] INK JET PRINTING HEAD AND SERIAL PRINTER

[75] Inventors: Aquilino Barbero, Pavone Canavese; Roberto Realis Luc, Ivrea, both of Italy

[73] Assignee: Ing. C. Olivetti & C., S.p.A., Ivrea, Italy

[21] Appl. No.: 452,845

[22] Filed: Dec. 23, 1982

[30] Foreign Application Priority Data

Dec. 23, 1981 [IT] Italy ........................ 68664 A/81

[51] Int. Cl.$^3$ ........................ G01D 15/16

[52] U.S. Cl. ........................ 346/140 R; 400/126

[58] Field of Search ........................ 346/140 R; 400/126

[56] References Cited

U.S. PATENT DOCUMENTS 4,329,698 5/1982 Smith ........................ 346/140

4,392,146 7/1983 Bouio ........................ 346/140

4,432,003 2/1984 Barbero ........................ 346/140

*Primary Examiner*—Joseph W. Hartary

*Attorney, Agent, or Firm*—Banner, Birch, McKie & Beckett

[57] ABSTRACT

The printing head (12) comprises an insulating container (14) for conductive ink (16) which is expelled through a fine nozzle (18) when a voltage pulse is applied between an electrode (56, 57, 40) and a counter-electrode (22). Capillary passages (51, 50) lead to the nozzle (18) to allow formation of an ink meniscus (23) right up until exhaustion of the ink. A vent (69) keeps the pressure inside the container constant. The head (12) is snap fitted onto a carriage with a conductive plate abutted by the counter-electrode (20) and a spring contacting the external part (40) of the electrode. This plate and spring are fed by way of conductive elements sliding along conductive carriage guides.

18 Claims, 7 Drawing Figures

CONTROL UNIT

INK JET PRINTING HEAD AND SERIAL PRINTER

BACKGROUND OF THE INVENTION

The present invention relates to ink jet printing heads and to the printers using such heads. In particular, the invention relates to an ink jet printing head for a liquid and electrically conductive ink, comprising an electrically insulating container for the ink, having a nozzle for the selective discharge of particles of ink, an electrode in contact with the ink and a counter-electrode adjacent to the nozzle, the discharge of ink being caused by an electrical voltage pulse between the counter-electrode and the electrode.

In the known heads of the above-indicated type, the container is connected by means of conduits to a larger-capacity tank which is disposed some distance from the printing location. In the case of printers in which the head is mounted on a movable carriage, the tank is disposed on the fixed part of the machine and is connected to the container by way of flexible conduits of substantial length. Pump means are required for conveying the ink from the tank to the head, so that the printer is expensive to produce and complicated in operation.

SUMMARY OF THE INVENTION

The object of the present invention is to provide an ink jet printing head which does not require a separate tank and which can easily be replaced when the ink is used up.

With a view to meeting this object, the invention is characterised in that the container is substantially closed and comprises means for permitting the formation of an ink meniscus in the nozzle, until the ink in the container is exhausted.

BRIEF DESCRIPTION OF THE DRAWINGS

The invention will now be described in more detail, by way of example, with reference to the accompanying drawings, in which.

DESCRIPTION OF THE PREFERRED EMBODIMENTS

Figures 1, 2, 3:
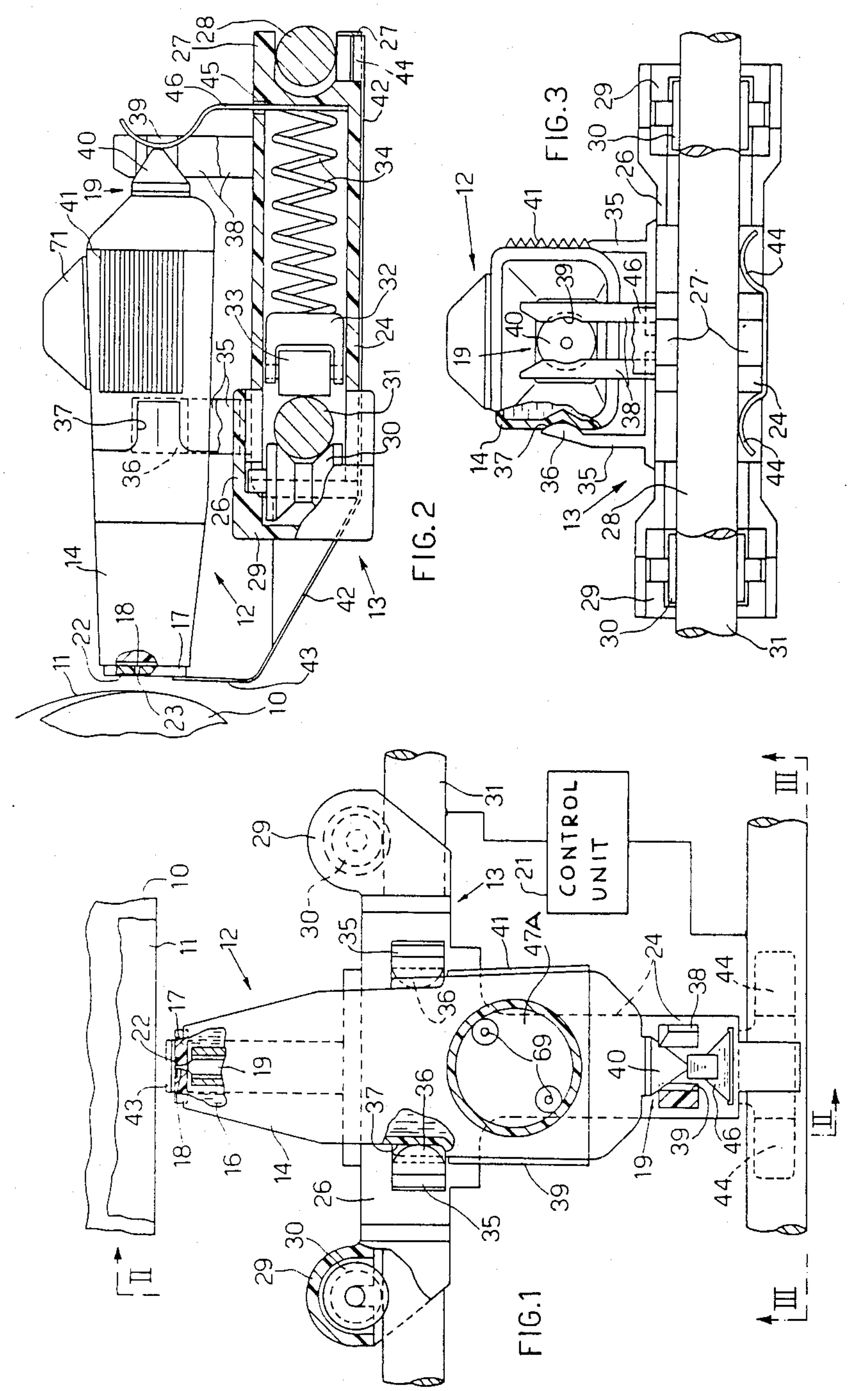
FIG. 1 is a partly sectional plan view of a printer incorporating a printing head embodying the invention.
FIG. 2 is a view of the printer in longitudinal section taken along line II—II in FIG. 1.
FIG. 3 is a rear view of the printer taken along line III—III in FIG. 1.

Referring to FIG. 1, the printer has a platen roller 10 around which a sheet of paper 11 is rolled. The roller 10 is capable of rotating selectively to permit the printing of dots in successive elementary lines, for example for alphabetic printing in a dot-matrix format.

The printer comprises an ink jet printing head which is mounted on a carriage 13 which is movable transversely in a known per se manner.

The head 12 essentially comprises a container 14 of insulating material, for the ink 16 which is electrically conducting. The container 14 is closed towards the roller 10 by a plate 17 in which a nozzle 18 is provided, for the expulsion of particles of ink 16. The ink is in electrical contact with an internal electrode 19 which is connected to the outside of the container 14.

The printer comprises an electrical control circuit 21 which is operable to supply an electrical voltage pulse between the electrode 19 and a counter-electrode 22 adjacent to the nozzle 18. A state of electrical and thermal excitation is then generated between the counter-electrode 22 and the electrode 19, at the location of the meniscus 23 which the ink 16 forms in the nozzle 18, such as to cause a plurality of particles of ink to be expelled by way of the nozzle 18, substantially in the manner described in published British patent application GB No. 2087314.

The carriage 13 is of electrically insulating plastics material and is substantially of a cross-like shape, with an internally hollow longitudinal arm 24 (see FIG. 2), and a transverse arm 26 of C-shaped cross-section. At the rear, the arm 24 terminates in two limb portions 27 embracing a first transverse guide 28 for the carriage 13. The two ends 29 of the arm 26 (see FIG. 1) area of a bulged configuration and house two rollers 30 which have their axes vertical and which co-operate with a second transverse guide 31 for the carriage 13.

Housed in the hollow portion of the arm 24 (see FIG. 2) is a metal block 32 of C-shaped longitudinal section. Mounted on the block 32 is another roller 33 which however is metal. The roller 33 is urged against the guide 31 by a compression spring 34.

The carriage 13 is also provided with two resilient arms 35 (see FIG. 3) which are directed upwardly and which are each provided with a projection 36 capable of co-operating with a corresponding seat portion 37 in the side of the container 14 to fit the head 12 vertically on the carriage 13, by a snap-type fitting action. The carriage 13 also has two resilient arms 38 which have an arcuate portion 39 and which are capable of engaging a tapered projection portion 40 of the electrode 19. The two resilient arms 38 therefore urge the head 12 towards the roller 10 into a predetermined position, as will be seen more clearly hereinafter. The two sides of the container 14 each have a knurled portion 41 to make it easier to grip it in the operations of fitting and removing the head 12 to and from the carriage 13.

A metal plate 42 (see FIG. 2) is fixed to the bottom surface of the longitudinal arm 24 of the carriage 13. The metal plate 42 terminates at the front with a tongue portion 43 which contacts the counter-electrode 22 when the head 12 is fitted onto the carriage 13 and determines the above-mentioned longitudinal position thereof. At the rear, the plate 42 terminates with two bent limb portions 44 (see FIG. 3) which bear resiliently against the guide 28.

A metal tongue portion 46 of bow-like configuration is fitted into a slot or opening 45 (see FIG. 2) in the top wall portion of the arm 24 of the carriage 13. The upper end of the portion 46 is in contact with the portion 40 of the electrode 19 when the head 12 is fitted on the carriage 13. The two guides 28 and 31 (see FIG. 1) are electrically connected to the control circuit 21. Therefore, on the one hand, by means of the guide 38, the plate 42 and the tongue portion 43, the circuit 21 is electrically connected to the counter-electrode 22 of the head 12, while on the other hand, by way of the guide 31, the roller 33, the block 32, the spring 34, the bow-like portion 46 and the portion 40, the circuit is electrically connected to the electrode 19 of the head 12.

Figure 4:
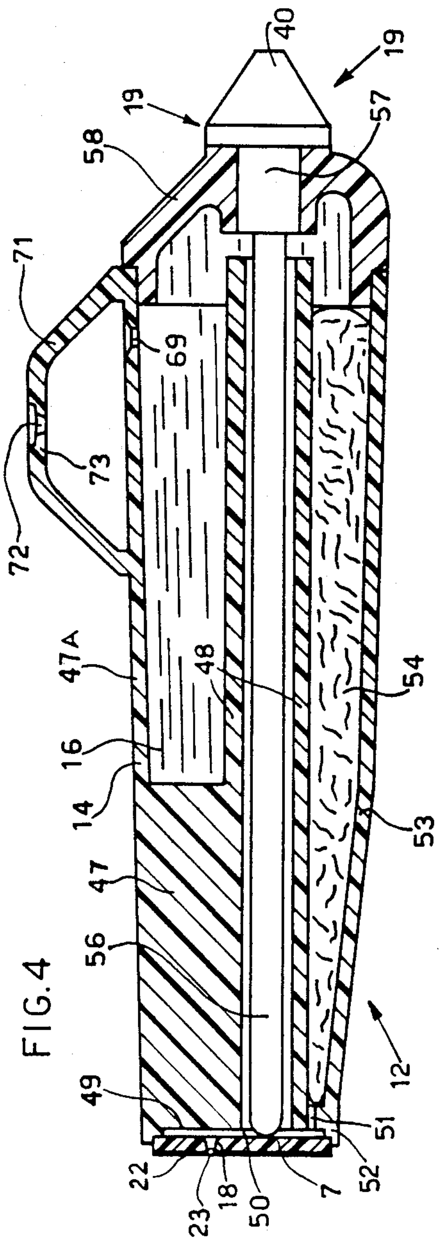
FIG. 4 is a view of the printing head in longitudinal section on an enlarged scale.
Figure 5:
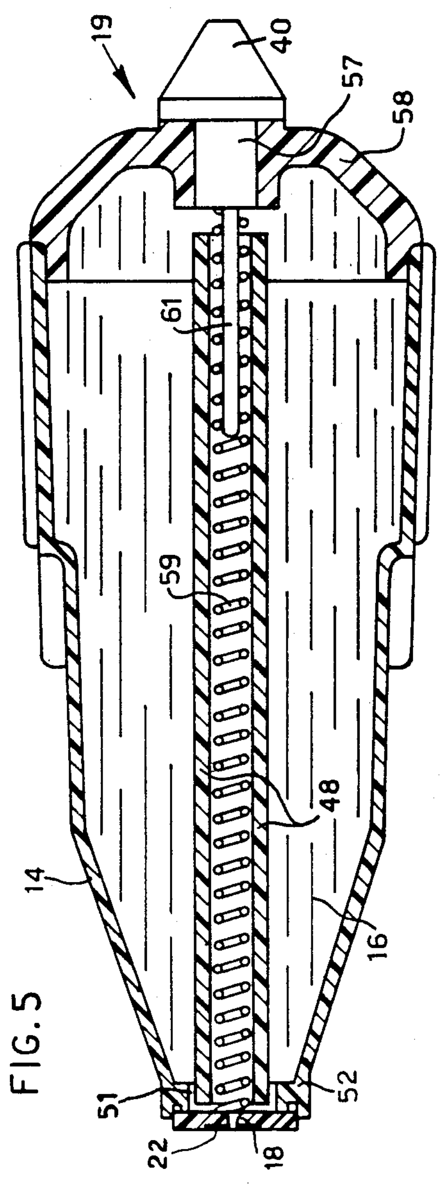
FIG. 5 is a view in horizontal section of an alternative embodiment of the head shown in FIG. 4.

The container 14 of the head 12 (see FIGS. 4 and 5) is oblong in a direction parallel to the nozzle 18 and has a capacity of about 3 $cm^3$ of ink 16. The container 14 comprises means for permitting the formation of the meniscus 23 (see FIG. 7) in the nozle 18, until the ink 16 in the container 14 is used up. In particular, such means comprise a capillary passage between the container 14 and the nozzle 18.

Figure 7:
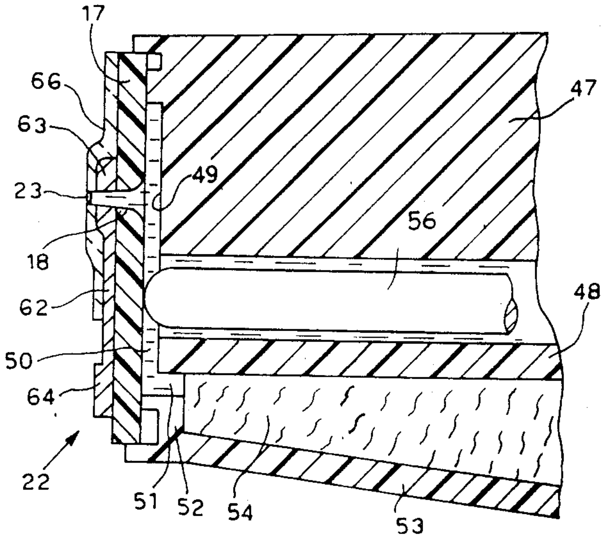
FIG. 7 is a detail view of the printing head, on an even more enlarged scale.

For that purpose, the container 14 comprises a block 47 (see FIG. 4) which is formed in one piece with the upper wall portion 47A of the container 14. The block 47 integrally provides a tube 48 which is open at both ends, with the electrode 19 being disposed therein. As shown in FIG. 7, the block 47 has an end surface 49 which is disposed parallel to the plate 17 at a distance therefrom which is of the same order of magnitude as the thickness of the plate 17, so as to form a space or cavity 50 of capillary depth.

The thickness of the plate 17 is from 5 to 20 times the diameter of the nozzle 18, which can be from 20 to 100 μm. In particular, in the construction shown in FIG. 7, the diameter of the nozzle 18 is selected as 30 μm, the thickness of the plate 17 is 0.6 mm, and the depth of the cavity 50 is about 0.3 mm.

The capillary passage further comprises a semi-annular cavity 51 which is provided between the outside surface of the end of the tube 48 and the inside surface of an end edge portion 52 of the container 14, which serves to support the plate 17. The cavity 51 is also of a capillary thickness and forms a communication between the end of the container 14 and the cavity 50, so that it will be seen that the capillary passage 50 and 51 forms a communication between the end of the container 14 and the nozzle 18, to permit the formation of the meniscus 23, until the ink 16 is used up.

Disposed between the tube 48 (see FIG. 4) and the bottom wall of the container 14 is a layer 54 of spongy material. The layer 54 permits the ink to flow more gradually into the cavity 51 when the level of the ink falls below the tube 48. Therefore, the time at which the ink 16 in the head 12 is used up is preceded by a period of reduced ink flow, during which the printing produced is paler, signalling to the operator the need to perform an operation for replacing the head. Such an early-warning indication is particularly necessary in situations where the printer is part of an automatic printing apparatus or a peripheral unit of a system for processing or transmitting data, texts or images to be printed.

In order to ensure electrical contact between the ink 16 and the electrode 19, the electrode 19 comprises a rod 56 which is housed in the tube 48 and which extends into contact with the plate 17. A rear plug portion 57 of the rod 56 forms a sealed closure in the rear wall 58 of the container 14 and terminates in the external tapered projection portion 40.

In accordance with an alternative embodiment of the electrode 19, the electrode comprises a compression spring 59 (see FIG. 5) which is disposed between the plate 17 and the plug portion 57 which forms the sealed closure at the rear wall 58 of the container. In this case, a rod 61 of limited length serves as a guide for the spring 59. It will be clearly appreciated that the spring 59 ensures contact along the plate 17 with the ink 16 until the last film thereof, which rises by a capillary action in the passage 50–51.

The plate 17 which closes the container 14 comprises an alumina plate on which the counter-electrode 22 is formed by a screen printing method. In particular, the counter-electrode 22 comprises a layer of conducting metal 62 (see FIG. 7), which is about 80 μm in thickness and which is further thickened by electrolytic deposition until it is 150 μm thickness in a circular region 63 which is concentric with the nozzle 18, and in a region 64 for contact with the tongue portion 43 (see FIG. 2). A layer 66 of high melting point glass, which is 50 μm in thickness, is then formed over the layer 62, to protect the electrode 22 from erosion, while leaving exposed the region 64 for contact with the tongue portion 43. Finally, the plate 17, together with the two layers 62 and 66, is pierced with a laser beam acting from the side opposite to the layers 62 and 66, to form the nozzle 18 which is about 30 μm in diameter, with a predetermined taper towards its orifice.

The total length of the nozzle 18 is therefore about 0.8 mm, of which an intermediate portion is formed by the thickness of the region 63 of conducting material.

Since the meniscus 23 tends to form towards the outside edge of the nozzle 18, the counter-electrode 22 is normally also in contact with the ink 16 and is covered by a thin layer of ink. When the voltage pulse between the electrode 19 and the counter-electrode 22 is produced, a current is generated in the ink in the nozzle 18, such as to suddenly heat and vaporize a portion of ink 16 which is concentrated towards the smaller-diameter region of the nozzle and is thus adjacent the orifice thereof, limiting the formation of bubbles in the container 14. The above-described vaporization effect thus generates a condition of agitation such as to expel the layer at high speed, thus printing a dot on the paper 11 (see FIGS. 1 and 2).

In order to ensure that the pressure within the container 14 does not vary because of the tendency to form bubbles and thus in dependence on the frequency of discharge of particles of ink, thereby causing variations in the position of the meniscus 23, the upper wall 47A (FIGS. 1 and 4) of the container 14 is provided with two vent holes 69 which are less than 1 mm in diameter, being for example 0.9 mm in diameter. Normally, because of its viscosity, the ink 16 does not escape from the holes 69. However, whenever the internal pressure increases, it might occur that particles of ink escape to the exterior. In order to catch any such particles, a bell-shaped portion 71 (FIGS. 2 and 4) is disposed over the holes 69 on the wall 47A, within which portion particles of ink can be trapped. The bell portion 71 is in turn provided with a hole 72 to ensure that the pressure in the bell portion 71 and thus in the container 14 is ambient pressure.

The hole 72 could possibly be formed, in any known manner, only when the head 12 is mounted on the carriage 13. For example, the bell portion 71 could be formed with a reduced-thickness region 73 which can be pierced with a pin. The hole-forming operation could also take place automatically, when the head 12 is removed from its packaging.

The foregoing description clearly shows the advantage of having an easily interchangeable ink jet printing head, as for any disposable cartridge, without the need for connection by means of flexible conduits, pumps or tanks.

It is also possible to produce coloured printing, by using heads with inks of different colours, with the head for producing the desired colour being mounted in turn on the carriage.

Figure 6:
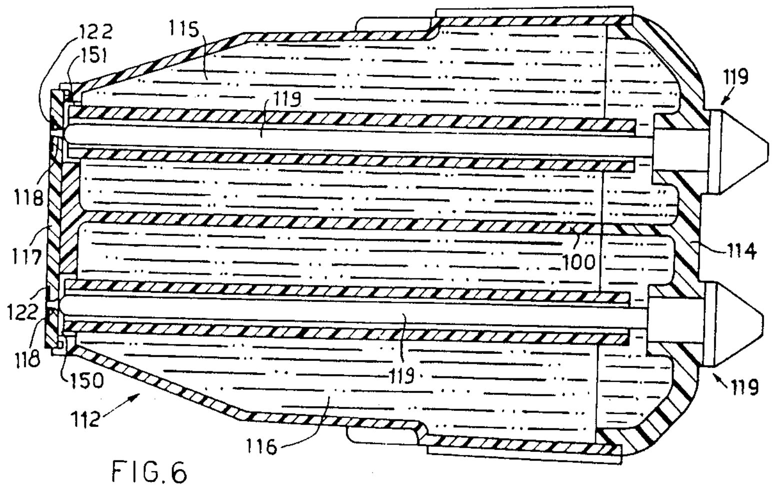
FIG. 6 is a view in horizontal section of another alternative embodiment of the head shown in FIG. 4.

In accordance with an alternative embodiment of the invention, the printing head 112 (see FIG. 6) may be designed for two-colour printing, for example red and black, as is usual in the case of calculating machines and accounting machines. In such a case, the head 112 comprises a double container 114, a portion 115 of which is filled with red ink and another portion 116 is filld with black ink. The two portions 115 and 116 are separated by a partition 100. The container comprises a plate 117 with two nozzles 118 and two counter-electrodes 122. Associated with each of the two portions 115 and 116 is a corresponding tube 148 which forms a corresponding capillary passage 150 and 151 and in which a corresponding electrode 119 is housed. Such a two-colour head 112 is provided with a carriage (not shown) which is moved transversely, in dependence on the colour required for the printing operation, by a distance equal to the distance between the two nozzles 118, so that the desired nozzle 118 is selectively moved to the printing location.

It will be appreciated that various modifications and improvements may be made in the above-described head and printer, without departing from the scope of the invention. For example, the two nozzles 118 of the head 112 may be disposed in two planes and may be selected by a vertical movement, or they may be convergent and selected by a rotary movement.

We claim:

1. An ink jet printing head for printing with liquid, electrically conductive ink, comprising an electrically insulating container (14) for the ink, having a nozzle (18) for the selective discharge of particles of ink in a predetermined direction, an electrode (19) in contact with the ink and a counter-electrode (22) adjacent to the nozzle, the discharge of ink being caused by an electrical voltage pulse between the counter-electrode and the electrode, characterised in that the container (14) is formed of a rigid body closed by an end wall (49) adjacent said nozzle and perpendicular to said direction, and comprises a first capillary passage (50) located on said body in a plane perpendicular to said direction between the nozzle (18) and said end wall, and a second capillary passage (51) on the lowest part of said end wall to convey said ink into said first passage, thus for permitting the formation of a meniscus (23) of ink in the nozzle (18) until the ink in the container is exhausted.

2. A head according to claim 1, characterised in that the means permitting the formation of a meniscus (23) comprise at least one capillary passage (50) disposed in a plane perpendicular to the said direction between the nozzle (18) and the end of the container (14).

3. A head according to claim 1, characterised in that said body includes a vent hole (69) in the top wall (47A) of the container (14), thereby always to maintain atmospheric pressure within the container.

4. A head according to claim 1, characterised in that the body of the container (114) comprises two cavities (115, 116) which are separated by a partition (100) and which may contain two inks of different colours, each cavity being associated with a corresponding nozzle (118), a corresponding electrode (119) a corresponding counter-electrode (122), and with corresponding first capillary passage and second capillary passage.

5. A head according to claim 4, characterised in that said two cavities (115, 116) are symmetrical with respect to the partition (100), the two nozzles (118) being parallel and aligned in a horizontal plane.

6. An ink jet printing head for printing with liquid, electrically conductive ink, comprising an electrically insulating container (14) for the ink, having a nozzle (18) for the selective discharge of particles of ink in a predetermined direction, an electrode (19) in contact with the ink and a counter-electrode (22) adjacent to the nozzle, the discharge of ink being caused by an electrical voltage pulse between the counter-electrode and the electrode characterised in that the container (14) is closed by an insulating plate (17) in which the nozzle (18) is formed, the thickness of the plate being from 5 to 20 times the diameter of the nozzle, and in that said container is provided with a capillary passage (50) disposed in a plane perpendicular to said direction between the nozzle (18) and the end of the container (14) for permitting the formation of a meniscus (23) of ink in the nozzle (18) until the ink in the container is exhausted, said capillary passage (50) comprises a cavity formed between the plate and a surfce (49) within the container (14) and parallel to the plate, at a spacing of the same order of magnitude as the thickness of said plate.

7. A head according to claim 6, wherein the counter-electrode (22) is produced on the outside surface of the plate (17) by a thick film process, characterised in that the counter-electrode is formed by a thick film layer (13) of conducting material forming a ring, the inside diameter of which is substantially equal to that of the nozzle (18), the first layer being covered by a layer (66) of wear-resistant material.

8. A head according to claim 6, characterised in that the electrode (19) connects the outside of the container (14) to the cavity (50).

9. A head according to claim 8, characterised in that the container (14) is oblong in a direction parallel to the nozzle (18), the electrode (19) comprising a portion (40) outside the container on the outside wall thereof, which is opposite to the nozzle.

10. A head according to claim 9, characterised in that disposed within the container (14) is a tube (48) which is substantially parallel to the said direction and which is open at its two ends for passing or supporting the electrode (19).

11. A head according to claim 10, characterized in that the electrode (19) comprises a rigid rod (56) between the said portion (40) outside the container and the cavity (50).

12. A head according to claim 11, characterised in that the electrode (19) comprises a compression coil spring (59) between the said portion (40) outside the container and the cavity (50).

13. A head according to claim 10, characterised in that the tube (48) is connected to the upper part (47A) of the container (14) by a body portion (47) comprising the said internal surface (49).

14. A head according to claim 10, characterised in that a spongy material (54) is disposed between the tube (48) and the bottom of the container (14) for producing a gradual approach to the condition of exhaustion of the ink in the container.

15. An ink jet printing head for printing with liquid, electrically conductive ink, comprising an electrically insulating container (14) for the ink, having a nozzle

(18) for the selective discharge of particles of ink in a predetermined direction, and electrode (19) in contact with the ink and a counter-electrode (22) adjacent to the nozzle, the discharge of ink being caused by an electrical voltage pulse between the counter-electrode and the electrode, characterised in that the container (14) is substantially closed and comprises means (50, 51) for permitting the formation of a meniscus (23) of ink in the nozzle (18) until the ink in the container is exhausted, said means including a vent hole (69) in the top wall (47A) of the container (14), thereby always to maintain atmospheric pressure within the container, and characterised in that the vent hole (69) is a capillary hole and forms a communication between the interior of the container (14) and a chamber (71) which is without ink and which in turn is provided with a hole (72) communicating with the exterior, whereby any particles of ink which escape from the container as a reaction to the discharge of the printing jet are trapped in the chamber.

16. A serial printer comprising a carrier (13) for a selective ink jet printing head 12 for printing with liquid, electrically conductive ink, comprising an electrically insulating container (14) for the ink, having a nozzle (18) for the selective discharge of particles of ink in a predetermined direction, an electrode (19) in contact with the ink and a counter-electrode (22) adjacent to the nozzle, the discharge of ink being caused by an electrical voltage pulse between the counter-electrode and the electrode, characterised in that said carrier (13) includes a pair of lateral resilient arms (35) cooperable with corresponding seat means (37) of the container (14), said carrier being provided with a longitudinal resilient arm (46) cooperating with a rearward projection (40) of said container (14) to urge same against a forward stop means (43), whereby said head (12) is spring locked on the carrier (13).

17. A printer according to claim 16, characterised in that said projection is of conducting material and is connected to said electrode, said stop means being formed of a rigid plate (42, 43) secured to said carrier (13), said leaf spring (46) and said plate (42, 43) being both of conducting materials for connecting the electrode (19) and counter-electrode (22) to a pulse generator (21).

18. A printer according to claim 17, characterised in that the carrier comprises a carriage (13) of insulating material, which is movable transversely with respect to the print carrier (10) on electrically conducting guides (28, 31), the pulse generator (21) being connected to the guides, the carriage comprising contacts (33, 44) which bear slidably on the guides and which are electrically connected to the rigid plate (42, 43) and the spring (45).

* * * * *